3,715,307
TREATMENT OF WATER USED IN HEAT
TRANSFER EQUIPMENT
Dwight Johnson, Minneapolis, and William G. Mizuno,
St. Paul, Minn., assignors to Economics Laboratory,
Inc.
No Drawing. Filed June 24, 1971, Ser. No. 156,530
Int. Cl. C02b 5/06
U.S. Cl. 210—58             4 Claims

ABSTRACT OF THE DISCLOSURE

Maleic anhydride copolymers (e.g., copolymerized with vinyl acetate) are used in additive amounts in water (e.g., sea water) to reduce maintenance problems associated with the use of such water in heat transfer equipment (e.g., evaporators).

BACKGROUND OF THE INVENTION

Water which is fed to heat transfer equipment such as boilers and evaporators generally contains dissolved salts. The nature and amount of such salts vary widely depending upon the source of water (e.g. fresh well water or sea water). The concentration of these salts in heat transfer equipment (especially in boilers and evaporators) tends to increase with usage, particularly in that portion of the water immediately adjacent to the metallic heat transfer surfaces of, for example, an evaporator. As a result of this concentration of dissolved salts, and as a result of chemical changes that occur in these salts, deposits are formed on the metallic heat transfer surfaces and sediment or sludge form in the heat transfer equipment. The deposits tend to become hardened with time, reduce the rate of heat transfer, and, together with the sediment, present serious corrosion and cleaning problems.

In the prior art, various methods have been suggested for controlling the formation of hard deposits or scale on metallic heat transfer surfaces by the use of certain chemical additives in the feed water. For example, U.S. Pat. 2,783,200 discusses the various problems which are encountered and describes several prior art agents for inhibiting scale formation. That patent suggests that the stickiness of the sludge formed in boilers and evaporators can be reduced and the rate of settling of the sludge accelerated by the use in the boiler feed water of from 0.3 to 20 p.p.m. of a water soluble acrylic polymer. Similarly, U.S. Pat. 3,463,730 describes the problems associated with the formation of deposits of salts on heat exchange surfaces. This patent suggests a distinctly different approach from that of U.S. 2,783,200. According to U.S. 3,463,730, the use in boiler feed water of a small amount of a hydrolyzed polyacrylamide acts as a dispersant or deflocculant for sludge that is formed in the boiler or other heat transfer vessel.

The problems are particularly pronounced when the water used is sea water (i.e., a saline solution). Sea water evaporators (e.g., shipboard evaporators) present an especially difficult situation because they operate to intentionally distill fresh water from sea water, thereby forcibly concentrating the salts within the heat transfer equipment.

At the present time, various additives are used for treating sea water being fed to heat transfer equipment (e.g., shipboard evaporators). Each of these additives has its own advantages and disadvantages. For example, some are costly and others require high levels of additive concentration for optimum results. Others, although cheaper and/or easier to use, are not as effective as their more expensive counterparts. Still others are not commercially acceptable for use in sea water as contrasted to fresh or tap water.

SUMMARY OF THE INVENTION

The present invention is based upon the discovery that certain copolymers of maleic anhydride are effective water conditioners for use in treating the feed water to boilers, evaporators, and other heat transfer devices. These copolymers of maleic anhydride are particularly effective with sea water used in both boiler and evaporator applications.

According to a preferred embodiment of the present invention, vinyl acetate/maleic anhydride copolymers are used as water conditioners for sea water in shipboard evaporators. The polymer is optionally and preferably used in combination with a defoamer.

DETAILED DISCUSSION

Water

The process of the present invention is applicable to the treatment of water containing dissolved sludge or scale forming salts. Thus, it is applicable to both fresh water (e.g., well water) and sea water. It is particularly effective when used in conjunction with sea water.

Heat transfer systems

The present process is applicable to treatment of feed water with a wide variety of heat transfer systems or equipment. It is particularly applicable to heat transfer systems in which at least some portion of the feed water is converted from liquid water to steam. Thus, the present process is particularly well suited for the treatment of feed water for boilers and evaporators. The present process offers particular advantages in the treatment of sea water used in shipboard evaporators. Shipboard evaporators generally operate under a reduced pressure to permit the sea water to be evaporated at temperatures below 140° F. (e.g., evaporated at 120°–135° F.). In such evaporators, sea water is fed into the evaporator on a continuous or semicontinuous basis. The conversion of sea water to fresh water is accomplished at a typical rate of about one ton of distilled water recovered per three tons of sea water fed to the evaporator.

The water conditioning agents

Suitable water conditioning agents are the water soluble, low molecular weight linear copolymers of maleic anhydride and copolymerizable ethylenically unsaturated organic compounds such as ethylene, propylene, butylene, vinyl acetate, acrylonitrile, acrylic acid, methyl acrylate, ethyl acrylate, methyl vinyl ether, sodium vinyl sulfonate, styrene and the like. Structurally, these copolymers can be represented as follows:

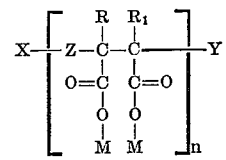

wherein R and $R_1$ can each be hydrogen or an organic radical containing from 1 to 8 carbon atoms (R and $R_1$ can be the same or different), Z is an organic radical containing 1 to 8 carbon atoms, M is hydrogen, ammonium or an alkali metal (e.g. sodium), $n$ is an integer, and X and Y are terminal groups and are hydrogen or short chain organic groups.

Water soluble copolymers having an equivalent weight (calculated on an acid basis) of about 58 to 150, more usually from about 58 to 110 are preferred.

It is somewhat difficult to establish an absolute value for an upper limit of the degree of polymerization (i.e., "n") above which the copolymers no longer function efficiently as water conditioning agents. Practical considerations appear to be the primary determining factor as the degree of polymerization increases. For instance, as the molecular weight of the copolymers increases, it is generally acknowledged that their water solubility tends to decrease. It is essential to the present invention that the copolymer be adequately soluble in water under regular usage conditions. The upper operable limit, therefore, so far as the degree of polymerization is concerned, is reached when it is no longer possible to get enough of the copolymer into solution. Although recommended use concentrations of these copolymers generally are in the parts per million (p.p.m.) range (i.e., up to 50 p.p.m.) it is desirable that they are soluble in water in the range of 1–50 weight percent (e.g., 5–30 weight percent) so that concentrates can be formed for ease in handling and use. Such a concentrate can be added directly to the water to be treated or more usually, partially diluted with, for example, sea water in a reservoir and the partially diluted concentrate then introduced into the water to be treated (e.g., sea water at the inlet to a shipboard evaporator) by a proportional metering device For the purposes of this invention, the viscosity of the copolymer is preferably relatively low. Since there are viscosity differences inherently associated with different copolymers, the preferred viscosities will vary. The polymer that is selected should be susceptible to handling and blending with the other desired additives or diluents, as well as affording satisfactory performance. For example, when using a copolymer of ethylene and maleic anhydride it is preferred that the specific viscosity be not substantially in excess of a value of 2 as determined on a one weight percecnt solution of the copolymer in dimethyl formamide at 25° C. Similarly, with a vinyl acetate-maleic anhydride copolymer (acid), it is preferred that the relative viscosity be from about 1.0 to 10.0, preferably about 1.0 to 3.0 when determined on a four percent aqueous solution at 25° C.

Copolymerization of maleic anhydride with other copolymerizable unsaturated monomers to produce copolymers free of amide groups is known in the art. For example, U.S. Pat. No. 2,938,061 describes the production of low molecular weight olefin/maleic anhydride polymers useful in the practice of this invention.

If desired, mixtures of copolymers can be used.

Other additives

If desired, the water conditioning copolymers of the present invention can be used alone or in combination with other additives. The ues of defoaming agents is particularly desirable when treating feed water for evaporators. Evaporators, particularly shipboard evaporators for sea water, operate under vacuum at relatively low temperatures (e.g., 125° F.) and the water being evaporated tends to foam, probably due to organic matter present in the sea water. Defoamers which can be used include the following: polypropylene glycol, ordered and random copolymers of ethylene oxide and propylene oxide, benzyl ethers of ethoxylated alkyl phenol, benzyl ethers of ethoxylated alcohols, benzyl ethers of copolymers of ethylene oxide and propylene oxide, alkyl phosphate esters, and the like.

A polyalkylene glycol (P–1200, a product of Dow Chemical Corporation) is preferred. This material is a polypropylene glycol having a molecular weight of about 1200. It has a tendency to separate out of concentrated aqueous solutions unless it is used in combination with a coupling solvent such as, for example, sodium xylene sulfonate.

Use of water conditioning agents

The copolymers, alone, diluted, or in combination with other additives, can be added in water conditioning amounts to the feed water before or after introduction of the feed water into the heat exchange device. In heat exchange systems such as shipboard evaporators for sea water, it is generally more convenient to add the water conditioning agent and other additives to the feed water by means of a proportional metering device just prior to introducing the feed water to the evaporator. The additives can be introduced slowly and continuously, or intermittently, as desired. The amount of copolymer used will be a water conditioning amount, generally less than 100 p.p.m. Desirably, the amount of coplymer used will be sufficient to provide or maintain a concentration of the poly-electrolyte in the water of from about 0.05 to 30 p.p.m., more usually from 0.1 to 10 p.p.m., preferably about 0.2 to 2.5 p.p.m.

The present invention is further illustrated by the following specific examples which include a preferred embodiment. Unless otherwise indicated, all parts and percentages are by weight.

Example 1

This example illustrates the preparation of a liquid water conditioning composition suitable for injection into feed water.

45 parts of a 40% aqueous solution of sodium xylene sulfonate is added to 26.2 parts of softened water. Next is added 0.5 part of polypropylene glycol (P–1200) followed by 28.3 parts of a 50% aqueous solution of a vinyl acetate/maleic anhydride copolymer (sodium salt) having a mole ratio of the monomers of 1:1 and a relative viscosity of about 1.1 when determined on a 4% aqueous solution in the acid form at 25° C. using a Cannon-Fenske viscometer tube. The foregoing materials are added with agitation and mixing is continued until the product is uniform.

EXAMPLE 2

This example illustrates the use of the present invention in connection with "synthetic" sea water.

A synthetic sea water was prepared for purposes of simulating conditions that might be encountered in sea water evaporators. For this purpose, the following salts in the amounts indicated were used to make up one liter of synthetic sea water.

| Salt: | Weight, gms. |
|---|---|
| $MgSO_4 \cdot 7H_2O$ | 6.960 |
| $MgCl_2 \cdot 6H_2O$ | 5.075 |
| KBr | 0.100 |
| KCl | 0.675 |
| $SrCl_2 \cdot 6H_2O$ | 0.024 |
| $NaHCO_3$ | 0.196 |
| NaCl | 27.213 |
| $CaCl_2 \cdot 2H_2O$ | 1.515 |
| Water—Balance to one liter. | |

A laboratory sea water evaporator was constructed from a 1000 ml. suction flask by passing the two legs of a ⊔ shaped copper tube through the stopper so that the bottom of the ⊔ was near the bottom of the flask. A short glass tube fitted with a needle valve was inserted through a third hole in the stopper. 500 ml. of synthetic sea water were placed in the flask. With an aspirator working at full capacity and using a steam flow through the copper tube sufficient to produce a vigorous boiling rate, the lowest attainable temperature of boiling was about 115° F. Insulation was placed around the copper ⊔ tube above the water line to prevent scale formation on that part of the copper tube. When operated in this way, the rate of evaporation was about 100 ml. of water per 15 minutes. The evaporated water was replenished continuously through the glass tube, first by 250 ml. of sea water to increase the salt concentration to 1.5 times normal and then by distilled water to keep the salt concentration and water constant. The liquid level was maintained at 500 ml.

When this laboratory system was run in this fashion without additives for 4 hours at 115° F., a slight amount of sludge was formed which settled on standing and formed a hard film. The copper tubing (cleaned before the test) acquired a partial dark coating.

By contrast, when the sea water was conditioned by the addition of 1.2 p.p.m. of a maleic anhydride/vinyl acetate copolymer (as the sodium salt; the same polymer as Example 1), and the system run for 6 hours, no hard film formed when the sludge or precipitate settled and the precipitate was much finer, flocculent, and more easily removed than either the precipitate formed without any additive or the precipitates formed using several known water conditioning agents (e.g., using a polyacrylamide as described in U.S. Pat. 3,463,730 such as Cyanamer P-38, marketed by American Cyanamid Company, Tychem 8145 which is a polyelectrolyte marketed by Standard Brands Chemical Industries, Inc., sodium polyphosphate and 1-hydroxy ethylidene-1, 1-diphosphonic acid).

EXAMPLE 3

This example demonstrates the fineness of the precipitate formed in the laboratory sea water evaporator of Example 2 in the presence of the vinyl acetate/maleic anhydride copolymer.

The evaporator was operated as described in Example 2 and the contents immediately transferred to a one pint glass bottle containing a magnetic stirring bar. This sample was placed in a cylindrical light tight box over a magnetic stirrer. The box had a 17 mm. round opening in its side 7 cm. from the bottom to admit a parallel light beam from a microscope lamp. A photo-conductive cell (Clairex Corporation CL5M5) was mounted in a seconding opening in the cylindrical box at the same height as the light admitting opening and at right angles to that opening to measure the light scattering properties of the precipitate. The entire interior of the box was painted with a flat black finish to minimize reflection. The conductance of the photo cell (a function of the light scattering) was measured with a conductivity bridge (Industrial Instruments, Inc. Model RC-18). The sample was stirred with the magnetic stirrer (gently to avoid air entrapment) for 15 minutes, then the stirrer was turned off, and settling of the precipitate measured intermittently over a 3 hour period. Such measurements were made with: (1) untreated synthetic sea water; (2) synthetic sea water treated with 0.24 p.p.m. of the copolymer; and (3) 1.2 p.p.m. of the vinyl acetate maleic copolymer. As the precipitate settled, there was a decrease in light scattering which resulted in decreased conductance. The results (in micro mhos/10 were then plotted versus time. The resulting curves provide the following approximate data:

CONDUCTANCE (micro mhos/10)

| Time (hrs.): | No treatment | 0.24 p.p.m. copolymer | 1.2 p.p.m. copolymer |
|---|---|---|---|
| Zero | 150-160 | | 150-160 |
| 0.5 | 60 | 80 | 90 |
| 1.0 | 51 | 65 | 75 |
| 2.0 | 46 | 54 | 59 |

These data bring out two important points. The presence of the vinyl acetate/maleic anhydride copolymer reduces slightly the amount of precipitate formed. More importantly, the precipitate formed is fine and, due to its fineness and/or electrical charge, remains in suspension. This effect is especially noticeable during the first 0.5 hour.

EXAMPLE 4

This example illustrates the use of the water conditioning composition of Example 1 in a shipboard sea water evaporator.

Experiments were conducted on shipboard sea water evaporators which had been producing 500 gallons per hour of distilled water using a commercially available starch solution as a water conditioner.

For experimental purposes, the composition of Example 1 was substituted for the starch composition previously used for water treating. This led to a 10 percent increase in the distillate output to 550 gallons per hour. The rate of use of the water conditioning composition was 22 fluid ounces per 24 hour period per evaporator. This is about 4.7 p.p.m. of the water conditioning composition in the sea water or about 0.62 p.p.m. of the copolymer, per se.

The use of the water conditioning composition of Example 1 eliminated clogging problems of the proportioning feed lines and was easly to handle. In addition to the 10 percent improvement in heat transfer efficiency (as reflected by distillate production), the evaporators were found to operate for long periods of time without the previously required frequent acid cleaning routine.

What is claimed is:

1. In the process of bringing feed water containing dissolved salts, including calcium salts, into contact with a metallic heat transfer surface wherein the calcium content in said feed water is at least about 400 parts by weight per million parts by weight of said feed water, expressed as calcium ion, or at least about 1000 parts per million, by weight, expressed as calcium carbonate, the improvement which comprises: adding to said feed water from about 0.2 to 2.5 parts per million of water soluble maleic anhydride/vinyl acetate copolymer (1:1 mole ratio) based on the weight of said feed water.

2. Process according to claim 1 wherein the amount of said copolymer which is added is in the range of 0.24 to 1.2 parts per million and the amount of said calcium, expressed as calcium carbonate is in the range of up to about 1010 parts per million.

3. Process according to claim 1 wherein said heat transfer surface is part of a shipboard evaporator and said feed water is sea water.

4. Process according to claim 3 wherein said polymer has a relative viscosity at a 4% concentration in water at 25° C. of from 1.0 to 3.0.

References Cited

UNITED STATES PATENTS 2,723,956  11/1955  Johnson _____ 210—58
3,617,577  11/1971  King _____ 210—58
2,783,200   2/1957  Crum et al. _____ 203—7 X
3,514,376   5/1970  Salutsky _____ 203—7

MICHAEL ROGERS, Primary Examiner

U.S. Cl. X.R.

159—DIG. 13; 203—7; 252—180